Aug. 16, 1960     W. L. FITE     2,949,015
COLD TRAP
Filed Dec. 30, 1957
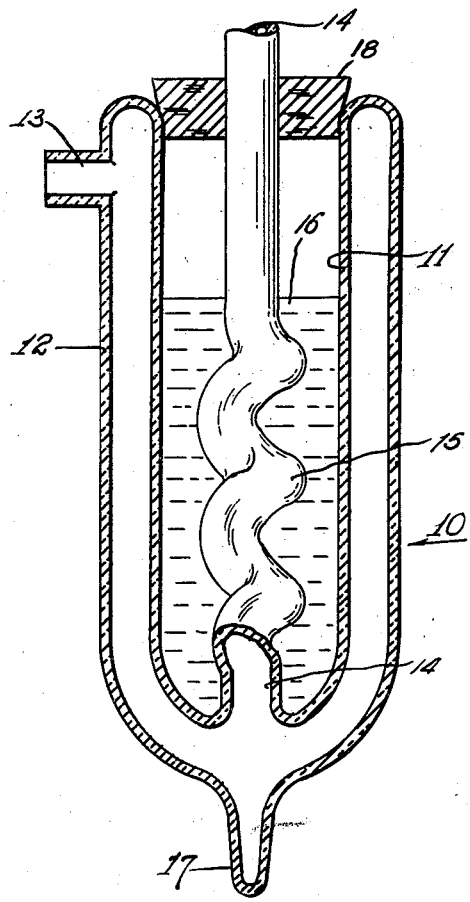
INVENTOR.
Wade L. Fite.
BY
Soans, Anderson, Luedeka & Fitch
Attorneys.

2,949,015
COLD TRAP

Wade L. Fite, Encinitas, Calif., assignor to General Dynamics Corporation, New York, N.Y., a corporation of Delaware Filed Dec. 30, 1957, Ser. No. 706,066

3 Claims. (Cl. 62—40)

This invention relates generally to cooling devices and more particularly to an improvement in a cold trap for condensing water and other vapors in vacuum or gaseous systems.

Cold traps are commonly used in vacuum and gaseous systems in which it is desired to remove water, mercury, or other unwanted vapors. These vapors enter into the system from many sources. A mercury diffusion pump which is often used to evacuate the system is a typical example of a possible source of mercury vapor. Also, internal instruments, impurities in the working gas, and the interior walls of the system are common sources of unwanted vapors.

A surface, which is at a lower temperature than the condensation temperature of an unwanted vapor, is often used to condense such vapor. The amount of vapor condensed is dependent upon the amount of cold surface area that is exposed to the vapor. Various constructions of cold traps have been used. In numerous applications, prior art cold traps do not provide enough cold surface to completely condense the unwanted vapors from the system. To increase the amount of condensation it is necessary to place previously available cold traps in series. Such an arrangement is undesirable since it requires added space and a large amount of coolant material.

The principal object of the present invention is to provide a compact cold trap having a large cold surface area.

Another object of the present invention is to provide a cold trap which requires a minimum of coolant material.

Still further objects of the present invention are to provide a compact "two-stage" cold trap; and to provide such a cold trap which is simple and economical to construct and efficient in operation.

Further objects of the invention will be apparent from the following description and accompanying drawing.

In the drawing, the single figure is a partial sectional view of a cold trap embodying the present invention.

A cold trap constructed in accordance with the present invention includes a double walled receptacle with suitable inlet and outlet conduits for delivering gases to and from the space between the walls of the receptacle. One conduit connects to and extends outwardly from the upper end of the outer wall of the receptacle and a second conduit connects to and extends upwardly from the bottom of the inner wall of the receptacle through its interior and outwardly beyond its mouth.

Referring to the drawing, there is shown a cold trap 10 formed of any suitable non-reactive material such as glass comprising a double walled receptacle of generally cylindrical configuration having an inner wall 11 and an outer wall 12 concentric therewith, which are joined together at their upper ends. The double walled receptacle is made of glass so that its transparency will allow visual inspection of the accumulation of condensed vapor. At the lower end of the double walled receptacle, the outer wall 12 converges into a projection 17. As will be hereinafter seen, this projection 17 allows condensed vapor to accumulate without obstructing the flow of gases through the cold trap 10.

Connected to the upper end of the outer wall 12 is a conduit 13. The interior of the conduit 13 communicates with the space between the walls 11 and 12 of the receptacle. Another conduit 14 connects to the bottom of the inner wall 11 of the receptacle and extends upwardly through the interior and beyond the mouth of the receptacle. The interior of the conduit 14 also communicates with the space between the walls 11 and 12 of the receptacle.

The conduit 14 is preferably formed into a helix as indicated at 15 with co-axial ends. The forming of the conduit 14 into a helix increases the surface area of the conduit 14 within the receptacle over that which would be available with just a straight conduit.

In operation, the space between the conduit 14 and the inner wall 11 is filled with a suitable coolant 16. The coolant used depends upon the type of vapor to be condensed. For example, powdered Dry Ice (solid $CO_2$) or liquid air is suitable for condensing mercury vapor.

If the coolant 16 is exposed to the atmosphere it will rapidly evaporate. To retard this evaporation, a suitable cover such as a cork stopper 18 may be used to close the mouth of the receptacle. This stopper 18 slidably engages the conduit 14 and therefore additionally acts as a lateral support for the conduit 14. The stopper 18 is in the form of a truncated cone of such a diameter that the lower end thereof engages the upper end of the inner wall 11 of the receptacle in a press fit.

The cold trap 10 is preferably connected into a vacuum or gaseous system so that the unwanted vapors to be removed initially pass through conduit 13, downwardly between the inner wall 11 and the outer wall 12, and thence upwardly through conduit 14. In this manner, the vapors are first exposed to the greater cold surface area of the inner wall 11. The majority of the vapors condense on this surface and thus are less likely to interfere with the flow of gases through the system. Also, by using this direction of flow, the vapors will pass through conduit 14, which is the colder portion of the cold trap 10, after being first precooled by passing through the space between the walls 11 and 12. However, the direction of flow of vapors through the cold trap 10 could be reversed without departing from the invention.

It is apparent that other shapes of the receptacle and the conduit 14 could be adapted without departing from the scope of this invention. Also, the bottom portion of the outer wall 12 of the cold trap 10 can be immersed in a bath of coolant material thereby cooling the outer wall 12 including the material that is used in the projection 17 of the receptacle.

As can be seen from the above description, condensed vapors either condense and freeze on the surfaces of the cold trap or collect in the projection 17.

Various of the features of the invention believed to be new are set forth in the accompanying claims.

I claim:

1. A cooling device comprising a double walled, open mouthed receptacle, a first conduit connected to and extending outwardly from the outer wall of said receptacle near the upper end thereof, the interior of said conduit communicating with the space between the walls of the receptacle, and a second conduit connected to and extending from the bottom of the inner wall of the receptacle through the interior thereof and beyond the mouth of the receptacle, the interior of said second conduit also communicating with the space between the walls of the receptacle, the space between the second conduit and the inner wall of the receptacle being adapted for receiving a coolant material, and the space between the double walls of the receptacle, at the lower end thereof, being adapted to collect condensed vapors.

2. A cold trap comprising a double walled, open mouthed receptacle, a first conduit connected to and extending outwardly from the outer wall of said receptacle near the upper end thereof, the interior of said conduit communicating with the space between the walls of the receptacle, and a second conduit partially formed into a helix connected to and extending from the bottom of the inner wall of the receptacle through the interior of and beyond the mouth of the receptacle, the interior of said second conduit also communicating with the space between the walls of the receptacle, the space between the second conduit and the inner wall of the receptacle being adapted for receiving a coolant material, and the space between the double walls of the receptacle, at the lower end thereof, being adapted to collect condensed vapors.

3. A cold trap comprising a double walled, open mouthed receptacle, a first conduit connected to and extending outwardly from the outer wall of said receptacle near the upper end thereof, the interior of said first conduit communicating with the space between the walls of the receptacle, a second conduit partially formed into a helix connected to and extending from the bottom of the inner wall of the receptacle through the interior of and beyond the mouth of the receptacle, the interior of said second conduit also communicating with the space between the walls of the receptacle, the space between the second conduit and the inner wall of the receptacle being adapted for receiving a coolant material, and the space between the double walls of the receptacle, at the lower end thereof, being adapted to collect condensed vapors, and means which slidably engages the upper part of the second conduit for closing the mouth of the receptacle so as to retard the evaporation of coolant material within the receptacle.

References Cited in the file of this patent

UNITED STATES PATENTS

| | | |
|---|---|---|
| 2,370,703 | Laikowsky | Mar. 6, 1945 |
| 2,513,114 | Smith | June 27, 1950 |
| 2,565,722 | Dawley et al. | Aug. 28, 1951 |